United States Patent [19]

Buddemeyer et al.

[11] 4,214,996
[45] Jul. 29, 1980

[54] MINERAL ENRICHMENT COMPOSITION AND METHOD OF PREPARING SAME

[75] Inventors: Bruce D. Buddemeyer; William A. Neville; Nancy A. Rozzo; Richard G. Bourne, all of Kansas City, Mo.

[73] Assignee: R.G.B. Laboratories, Inc., Kansas City, Mo.

[21] Appl. No.: 970,935

[22] Filed: Dec. 19, 1978

[51] Int. Cl.² ............................................. A23L 1/30
[52] U.S. Cl. ........................................ 252/1; 71/27; 426/74; 426/531; 260/429 R; 260/429.9; 260/438.1; 260/439 R; 260/545 P
[58] Field of Search ................ 71/27; 252/1; 426/74, 426/531; 260/429 R, 429.9, 438.1, 439 R, 545 P

[56] References Cited

U.S. PATENT DOCUMENTS

| | | | |
|---|---|---|---|
| 3,692,529 | 9/1972 | Richman | 252/1 |
| 3,794,740 | 2/1974 | Achorn et al. | 426/74 |
| 4,141,714 | 2/1979 | Mues et al. | 260/439 R |
| 4,152,271 | 5/1979 | Eisenberg | 252/1 |

*Primary Examiner*—Leland A. Sebastian
*Attorney, Agent, or Firm*—Schmidt, Johnson, Hovey & Williams

[57] ABSTRACT

Mineral-containing polymeric compositions of matter having high aqueous dispersibility, and methods of synthesizing the same, are disclosed which permit nutritionally important elements such as calcium, magnesium, phosphorus, potassium, iron and certain trace elements to be added in aqueous form to foods of all types without adversely affecting taste qualities. The compositions generally are high molecular weight species having moieties of the generalized formula

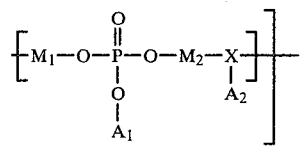

wherein $M_1$ and $M_2$ are preferably taken from the group consisting of calcium, magnesium, iron, nickel, copper, boron, zinc, manganese and molybdenum, $A_1$ and $A_2$ are respectively taken from the group consisting of hydrogen and the alkali metals, and X is an organic acid moiety having at least three carboxyl groups therein (preferably citrate). The synthesis preferably includes the steps of admixing in water a cation source, a potassium phosphate source and an organic acid, followed by heating and further agitation. Dispersibility of the compositions is enhanced by the use of hydroxyl-containing adjuncts such as sugars or the like. Edible forms of the composition hereof find particular utility as nutritional fortificants in traditional or ersatz foods; in addition, the compositions may be very useful in fertigation programs where minerals are applied to the soil during irrigation. Nonedible forms can be useful in virtually any context wherein dispersibility is desirable.

19 Claims, No Drawings

MINERAL ENRICHMENT COMPOSITION AND METHOD OF PREPARING SAME

BACKGROUND OF THE INVENTION

1. Field of the Invention

The present invention is concerned with novel mineral-containing polymeric compositions of matter which are highly useful as enrichments for foods and the like. More particularly, it is concerned with such compositions and methods of synthesis thereof, wherein the compositions exhibit very high dispersibility in aqueous media, thereby rendering the compositions useful as fortificants in a wide variety of food products.

2. Description of the Prior Art

The food industry has long sought stable water-dispersible forms of calcium, magnesium, phosphorus, potassium, iron and other trace elements in order that significant amounts of these essential nutrients can be introduced into food systems without adding attendant superfluous bulk. To be effective in such contexts, the mineral-containing substances must be essentially odorless, colorless, tasteless, and be produceable at modest cost. In addition, such products must exhibit stability when subjected to the condition extremes dictated by formulation, processing and storage.

In the past several years, fabricated foods have been rapidly increasing in number, and their peak appeal has likewise increased because of enhanced organoleptic properties, convenience, and economic and nutritional values. For example, a variety of fabricated (non-dairy) foods exemplified by margarine, imitation ice cream, non-dairy creamers, whipped topping mixes and pre-whipped toppings have made a major impact on sales of counterpart traditional foods and beverages. Similarly, there is increasing acceptance in the marketplace for non-dairy milks which may be completely free of milk protein.

A major problem confronting the fabricated food industry is in designing or formulating products which are essentially equal to their natural counterparts on a nutritional basis, particularly with respect to mineral content. For example, in the case of non-dairy milks it has heretofore been impossible to provide the desired amounts of calcium, inasmuch as there has been no relatively inexpensive and readily available calcium-containing composition which will remain in aqueous dispersion. As can be appreciated, it does little good to supply a calcium source with a non-dairy milk if the calcium simply precipitates to the bottom of the container and is never ingested. The problem of solubility or dispersibility in aqueous media is also present to a greater or lesser degree with respect to other vital nutrients such as magnesium, iron, copper, boron, zinc, manganese and molybdenum, and therefore use of these nutrients has been limited in fabricated foods.

It has also been suggested in the past that significant nutritional benefits could be gained if vital mineral nutrients were applied directly to the soil during irrigation procedures so that plants growing in the soil could take up the nutrients. Such a procedure has come to be called "fertigation." However, such proposals have found only limited use in the past for the reasons outlined above, i.e., lack of mineral-containing compositions which have adequate dispersibility in aqueous media.

U.S. Pat. Nos. 3,428,624 and 3,375,168 describe, respectively, the production of calcium sugar phosphates and water soluble phosphate compositions. However, the products described in these patents are not believed to have been successful in the marketplace, and certainly have not solved the problems outlined above.

SUMMARY OF THE INVENTION

In its broadest aspects, the present invention is concerned with compositions of matter which are generally of polymeric or quasi-polymeric form and it is theorized that they have high molecular weights of at least about 300,000. The compositions contain polyvalent cations taken from the group consisting of calcium, magnesium, iron, copper, boron, manganese, molybdenum, nickel, and zinc, and surprisingly exhibit high degrees of dispersibility or solubility in aqueous media. The compositions also include an organic acid moiety having at least three carboxyl groups therein, such as a citrate moiety; and in some instances adjuncts such as malto-dextrins and corn syrup, ranging in D.E. from 10–100, sucrose, dextrose, galactose, arabinose, ribose, xylose, maltose, lactose, raffinose, fructose, polyalcohols, i.e., glycerin or propylene glycol can be associated with the overall compositions to give an increase in dispersibility.

A method of synthesis of the mineral-containing compositions is also in the ambit of the invention, and broadly comprises the steps of admixing, in water, a cation source, an alkali metal phosphate source, and an organic acid having at least three carboxyl groups therein. The molar ratio of the alkali metal ions to phosphate ions is within the range of from about 1:1 to 6:1. The final step in the process involves heating the admixture for a sufficient period of time and at a temperature to yield water-dispersible products. Such products can be stored for relatively long periods of time at varying temperature conditions while nevertheless maintaining the desirable dispersibility in water or other aqueous media.

DESCRIPTION OF THE PREFERRED EMBODIMENTS

Mineral-containing compositions in accordance with the present invention include a moiety of the generalized formula

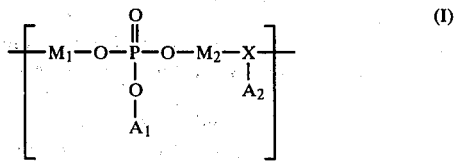

wherein $M_1$ and $M_2$ are respectively taken from the group consisting of calcium, manganese, iron, copper, boron, manganese, molybdenum, nickel, and zinc, $A_1$ and $A_2$ are respectively taken from the group consisting of hydrogen and the alkali metals, and X is an organic acid moiety having at least three carboxyl groups therein.

In the case of $M_1$ and $M_2$, the group consisting of calcium, magnesium, and iron is most preferred by virtue of the commercial and nutritional importance of these elements. In other preferred forms, $A_1$ and $A_2$ are respectively taken from the group consisting of hydrogen, lithium, potassium and sodium, and said acid moiety is a citrate moiety of the formula

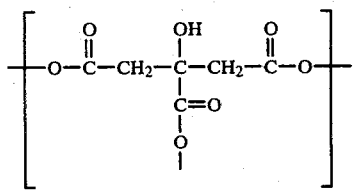

(II)

so that the overall moiety, in the most preferred form, has the following generalized formula:

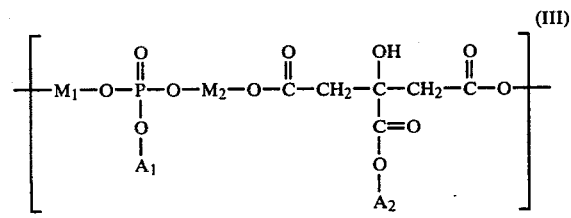

(III)

Analyses of the compositions of the invention have indicated that the compositions are quite ionic in character. Thus, the generalized formulae I and III may be more properly written as follows:

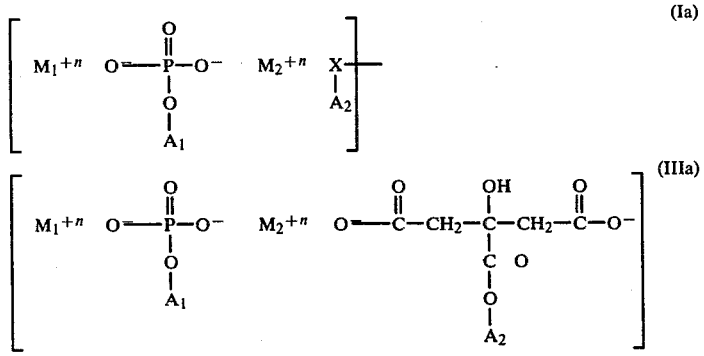

wherein n is at least 2.

The dotted line representations illustrated in formula (Ia) and (IIIa) are intended to indicate an ionic-type attraction, as opposed to a classical covalent bonding situation.

Although formula (Ia) and (IIIa) have been provided for completeness and to depict what may be the proper structure, it is to be understood that the invention is in no way limited to ionic or covalent bonding, or any theory relating thereto; rather, the compositions of the invention are best illustrated in a generalized way by formulae (I) and (III), which are intended to be generic to the corresponding formulae (Ia) and (IIIa).

In particularly preferred forms, the compositions of matter are in the form of polymers or quasi-polymers having a molecular weight exceeding about 300,000, with the depicted moieties, or analogs thereof, being recurrent throughout the compositions.

As is demonstrated in the Examples below, the compositions in accordance with the present invention exhibit surprising and very high dispersibilities in water or other aqueous media. Generally speaking, the compositions of the invention should exhibit an aqueous dispersability such that at least about 30% by weight of the theoretically available, non-alkali metal cations present therein are dispersed in water at ambient temperature.

In preparative procedures, cation-containing products of the invention having high degrees of dispersibility are made by first forming an admixture in water of respective quantities of: (1) a cation source selected from the group consisting of compounds of calcium, magnesium, iron, copper, boron, manganese, molybdenum, nickel, and zinc; (2) a potassium phosphate source selected from the group consisting of potassium dihydrogen phosphate, dipotassium hydrogen phosphate, tripotassium phosphate, and a mixture of phosphoric acid and a potassium source; and (3) an organic acid having at least three carboxyl groups therein.

The molar ratios of the starting materials should preferably be as follows: for phosphate ion to acid, from about 0.5:1 to 3:1, most preferably about 1:1; for alkali metal ions to phosphate ions, from about 1:1 to 6:1, most preferably about 2:1; for non-alkali metal cations to phosphate, from about 0.5:1 to 3:1, most preferably about 2:1; for non-alkali metal cations to acid, from about 1:1 to 5:1, most preferably about 2:1; and for alkali metal ions to acid, from about 0.5:1 to 7:1, most preferably about 2:1. In addition, for best results the starting admixture should be stoichiometrically balanced to achieve the desired end composition.

The next and final step of the method involves simply heating the admixture for a sufficient period of time and at a temperature to yield the desired products. Preferably, this involves heating the admixture to a temperature of from about 150° to 400° F., and thereafter further admixing the admixture at this temperature for a period of from about 10 to 60 minutes.

In cases where a preferred hydroxyl-containing adjunct such as corn syrup, glycerine, sucrose or dextrose is used, this should be added cold with the initial ingredients with thorough mixing. In most cases the initial admixture should contain at least about 60 percent by weight water, and in many instances significantly more than this figure. Although not absolutely critical to the production of desired compositions, it has been found desirable to add the respective components of the admixture by first adding the cation source to water followed by a period of mixing of from about 1 to 5 minutes; then adding the alkali metal phosphate source and mixing for a period of from about 1 to 5 minutes; and finally addition of the organic acid (preferably citric acid) with mixing for a period of from about 1 to 5 minutes. At the end of this stepwise addition and mixing process, the described heating and further mixing step can be effected.

If it is desired to produce a dry, reconstitutable product, it is generally preferred to homogenize the aqueous product or subject it to high shear mixing followed by drying (e.g., spray drying). The resultant solid or granular product can be reconstituted in aqueous media and exhibits substantially identical dispersibility properties as compared with the original liquid.

The products of the present invention can be stored virtually indefinitely without loss of their desirable properties, and are admirably suited as fortificants in connection with fabricated foods such as non-dairy milks and the like. In addition, products may have significant utility as fertigation agents.

The following Examples illustrate the compositions of the present invention, methods for synthesizing same, as well as the utility thereof. However, nothing in the following Examples should be taken as a limitation upon the overall scope of the invention.

EXAMPLE 1

A water dispersible mineral enrichment composition was made using the ingredients set forth in Table I below. Each ingredient was added in the order listed in Table I to a 2 liter glass beaker, and the ingredients were stirred with a high shear "Tekmar" mixer throughout the synthesis. During the initial blending, the beaker was placed in an ice water bath to prevent extreme temperature rise. The temperature at each addition and mixing times are noted in Table I.

The pH of the composition after initial blending was 6.75. The composition was then heated in a hot water bath over a hot plate while mixing was continued. This treatment was continued for approximately 35 minutes until a temperature of 180° was reached. The pH of the mixture at this time was 6.45.

A portion of this composition was placed in a sterilized bottle. The composition was semitransparent and hazy white in color, and appeared homogeneous throughout. Another portion was placed in a bottle and heated in a pressure cooker at 250° F. (15 p.s.i. steam pressure) for 15 minutes. This preparation was yellow in color and more transparent than the former sample, although a very slight haziness was observed.

These two samples were stored overnight at 45° F.; no precipitation was present and the samples appeared slightly less hazy than previously.

A portion of the 250° sample was filtered through activated charcoal; the substance was no longer yellow and appeared identical to the 180° sample.

EXAMPLE 2

The composition was prepared as described in Example 1. After mixing at room temperature, (maintained by ice/water bath) the pH was 6.7.

The composition was then heated to 180° F. (over approximately 30 minutes). The pH at this time was 6.65.

A sample taken after heating exhibited, after a few minutes at room temperature, a semitransparent upper layer, a dense cloudy layer, and a small amount of a white powdery precipitate.

Another sample was heated to 250° in a pressure cooker (15# pressure). This sample was similar in appearance to the previous one except that the upper layer was less transparent (more cloudy).

After remaining at room temperature for about five days, the 180° F. sample exhibited a white flocculent layer filling approximately the bottom 40% of the container. The single upper layer was nearly transparent.

The 250° F. sample at this time appeared to be a nearly homogeneous translucent fluid with a very small amount of white precipitate.

The compositions described in Examples 1 and 2 are useful from a nutritional standpoint for mineral fortification of foods for general consumption such as juices, carbonated and noncarbonated beverages, dairy analogs, soups, broths and other foods in which insoluble minerals are unfeasible. Other areas of application would be in infant formulas, pet foods, animal feeds, special dietary supplements or in a mineral "tonic", and for use as a fertilizer.

The compositions are capable of being spray dried, drum dried, vacuum dried or otherwise dehydrated and are then readily soluble or dispersible in a wide variety of aqueous media. They can be designed to provide a portion or all of the RDA of calcium, magnesium, iron, copper, zinc and phosphorus while having little or no effect on the taste or physical characteristics of the product to which it is added.

TABLE II

| Moles | Weight % (dry) | Weight % (actual) | Ingredient | Gms. | Temp. at Addition | Mixing Time to Next Addition |
|---|---|---|---|---|---|---|
| 42.917 | | 96.65 | Water | 773.2 | | |
| .050 | 13.82 | .46 | Calcium Hydroxide | 3.7 | 80° F. | 5 Min. |
| .033 | 7.08 | .24 | Magnesium Hydroxide | 1.9 | 85° F. | 5 Min. |
| .064 | 41.79 | 1.40 | Dipotassium Phosphate | 11.2 | 87° F. | 5 Min. |
| .048 | 37.31 | 1.25 | Citric Acid Anhydrous | 10.0 | 84° F. | 10 Min. |

EXAMPLE 3

TABLE III

| Ingredients | wt.-gms. | Temp. at Addition |
|---|---|---|
| Water | 773.2 | |
| 36 D.E. corn syrup | 200.0 | 76° F. |
| Calcium hydroxide | 3.7 | 77.5° F. |
| Magnesium hydroxide | 1.9 | 82° F. |

TABLE I

| Moles | Weight % (dry) | Weight % (actual) | Ingredient | Gms. | Temp. at Addition | Mixing Time to Next Addition |
|---|---|---|---|---|---|---|
| 42.917 | | 77.32 | Water | 773.2 | | |
| .364 | 85.65 | 20.00 | 36 D.E. Corn Syrup | 200.0 | 76° F. | 10 Min. |
| .050 | 1.98 | .37 | Calcium Hydroxide | 3.7 | 77.5° F. | 5 Min. |
| .033 | 1.02 | .19 | Magnesium Hydroxide | 1.9 | 82° F. | 5 Min. |
| .064 | 6.00 | 1.12 | Dipotassium Phosphate | 11.2 | 81° F. | 5 Min. |
| .048 | 5.35 | 1.00 | Citric Acid Anhydrous | 10.0 | 84° F. | 10 Min. |

TABLE III-continued

| Ingredients | wt.-gms. | Temp. at Addition |
|---|---|---|
| Dipotassium phosphate | 11.2 | 81° F. |
| Citric acid | 10.0 | 84° F. |
| | 1000.00 gm. | |

A mineral composition was prepared using the above ingredients in a 2 liter glass beaker which was placed in an ice water bath to prevent any extreme temperature rise during the initial blending. Continuous vigorous agitation was supplied with a "TEKMAR" mixer throughout the entire preparation.

Ingredients were added to the beaker in the order listed above. The corn syrup and water were mixed until well blended, approximately ten minutes. After addition of each subsequent ingredient, the composition was agitated for five minutes prior to the next addition. After introduction of the citric acid, mixing was continued for ten minutes. The pH of the composition at this point was 6.75.

The composition was then heated in a water bath over a hot plate, while agitation was continued for approximately 35 minutes until a temperature of 180° F. was reached. The pH of the composition was 6.45.

A sample of this product was placed in a sterilized bottle. The composition was semitransparent, whitish in color and appeared homogeneous.

After overnight storage at 45° F., the composition appeared almost completely transparent and no precipitation was present.

A portion of this sample was concentrated and dried in a vacuum oven and subsequently exhibited the ability to be readily reconstituted in water.

EXAMPLE 4

A water dispersible calcium, magnesium and phosphorus mineral enrichment composition of commercial proportions was made using the ingredients set forth in Table IV below. Each ingredient was added in the order listed in Table IV to a 200 gallon jacketed stainless steel mixing vessel equipped with a double counter-rotating stirrer and a loop circulation system whereby the product was drawn from the bottom outlet of the vessel and pumped into the top surface of the product. The temperature at each addition was controlled by a water-steam mixing valve and the times (Hold Time) following the addition of each ingredient are recorded in Table IV.

Following the heating period, the composition was homogenized hot at 3000 p.s.i.–500 p.s.i., first and second stage respectively through a Gaulin homogenizer and then pumped to a Damrow spray drier and dried.

The resultant dried powder in a 10% aqueous dispersion had a pH of 6.6 and a clear viscous slightly yellow solution resulted on the addition of 150 grams of the powdered composition to 100 grams of water (60% solids).

TABLE IV

MINERAL COMPOSITION - 25% SOLIDS

| Temperature °F. | Hold Time (min.) | Ingredients | Mole Ratio | Percent | Lb. | Oz. |
|---|---|---|---|---|---|---|
| 80 | | Water | | 75.00 | 562 | 8 |
| | 2 | Corn Syrup Solids 36 D.E. | 1.16 | 8.33 | 62 | 8 |
| | 2 | Calcium Hydroxide | .78 | 2.30 | 17 | 4 |
| | 3 | Magnesium Hydroxide | .51 | 1.18 | 8 | 14 |
| | 2 | Dipotassium Phosphate | 1.00 | 6.97 | 52 | 4 |
| 80 | 5 | Citric Acid Anhydrous | .81 | 6.22 | 46 | 10 |
| | | | | 100.00 | | |

EXAMPLE 5

NON-DAIRY MILK MINERAL ENRICHMENT COMPOSITION PREPARED IN SITU

For the purpose of demonstrating the utility of the mineral compositions, a non-dairy milk formulation was prepared. Fresh whole pasteurized milk has the following approximate mineral composition based upon the Agriculture Handbook No. 8-1, U.S. Dept. of Agriculture, Agricultural Research Service, Revised November 1976:

| Nutrients | Units | Amount in 100 grams |
|---|---|---|
| Calcium | mg. | 119 |
| Iron | mg. | .05 |
| Magnesium | mg. | 13 |
| Phosphorus | mg. | 93 |
| Potassium | mg. | 152 |
| Sodium | mg. | 49 |
| Zinc | mg. | .38 |

The nutrient composition of the non-dairy milk formulation was patterned after the above. Employing the formula as set down in Table V, the ingredients were combined in the order listed using a Case laboratory emulsifier. The Case unit includes a stainless steel, conical vessel having therein a series of superposed, perforated plates, with the perforations in respective plates being out of alignment with those of adjacent plates. The unit also includes a recirculation line for taking liquid from the bottom of the vessel back to the top thereof, and a positive displacement pump is interposed in the recirculation line for relatively high pressure recirculation of liquid material. During processing, the liquid components are recirculated through the emulsification apparatus and are subjected to vigorous agitation and shear. In addition, direct steam addition is provided for further agitation and heating of the liquid product during recirculation thereof.

In the use of the Case laboratory emulsifier, the starch-derived carbohydrate material and water are first admixed and run through the Case emulsifier to ensure complete dispersion thereof. The ingredients following were then added at the temperature stated in Table V and mixed for the period stated under Hold Time prior to the addition of the next ingredient.

Finally, other optional products such as salt and flavoring agents are added, with a final hold time period to ensure complete dispersion of the solids within the water. The product was then homogenized in a conventional Gaulin two-stage homogenizer using, 3500 p.s.i. first stage, and 500 p.s.i. second stage.

TABLE V

| Temperature °F. | Hold Time (Min.) | Ingredients | % by Weight |
|---|---|---|---|
| 75 | | Water | 83.283767 |
| | | Corn syrup 24 D.E. | 11.000000 |
| | 1 | High fructose corn syrup 120 D.E. | .250000 |
| | | Calcium hydroxide | .222000 |
| | 1 | Magnesium hydroxide | .031000 |
| | | Dipotassium phosphate | .705000 |
| | 1 | Citric acid anhydrous | .380000 |
| | | Electrolytic iron | .000146 |
| | | Zinc oxide | .000455 |
| 80 | | F. D. & C. yellow color | .013000 |
| 140 | 1 | Soybean oil (P/S ratio = 3.1) | 3.500000 |
| | | Diacetyl tartaric acid esters of mono-diglycerides | .100000 |
| | | Distilled succinylated monoglycerides | .100000 |
| | | Sodium stearyl-2-lactylate | .100000 |
| | | Hexaglycerol distearate | .100000 |
| 160 | 1 | Triglycerol monostearate | .100000 |
| | | Potassium chloride | .057000 |
| 175 | 1 | Artificial Milk flavor | .049000 |

This product was immediately cooled to 38° F., and the following nutritional fortification was intimately added thereto using a high shear mixer:

TABLE V (Continued)

| Temperature °F. | Hold Time (Min.) | Ingredients | % by Weight |
|---|---|---|---|
| 38 | | Vitamin A palmitate | .000956 |
| | | Ascorbic acid | .004781 |
| | | Thiamine mononitrate | .000038 |
| | | Riboflavin | .000186 |
| | | Niacinamide | .000164 |
| | | Vitamin D-2 | .000478 |
| | | Pyridoxine hydrochloride | .000064 |
| | | Vitamin $B_{12}$ (0.1%) | .000539 |
| | | Pantothenic acid | .001039 |
| 40 | 2 | Folic acid (1%) | .000387 |
| | | | 100.000000 |

The pH of this fortified synthetic milk was measured at 6.8, and freeze-thaw stability was excellent. The product exhibited all of the attributes of whole milk, i.e., general appearance, color, mouth feel, correct residual mouth feel and aftertaste. Also, no precipitation of solids from the liquid was observed.

EXAMPLE 6

The spray dried product prepared in Example 4 was tested for bioavailability of calcium and phosphorus in feeding studies utilizing weanling rats.

A standard purified diet for rats was used. The control diet contained $CaCO_3$ and $NaH_2PO_4$ as the sources of calcium and phosphorus. The test diet contained the product of Example 4 as the principal source of calcium, with $CaCO_3$ added to obtain a final calcium level of 0.60%. A third diet consisted of Purina Lab Chow.

It was noted that the control rats did not grow as well as the rats on the test diet or those on the Purina Lab Chow. The test animals did as well as those on the Purina Lab Chow which is considered to be an optimum diet for rats.

The bioavailability of the test product is reflected in the bone ash data expressed as a percent of the dry bone weight. The femur bone was utilized for the assay.

| Results: | |
|---|---|
| | Bone Ash/Dry Bone Weight |
| Control ($CaCO_3$) | 52.23% |
| Test Diet | 50.82% |
| Purina Lab Chow | 54.73% |

The data indicates that the calcium and phosphorus in the material prepared in Example 4 are readily available to the rat.

EXAMPLE 7

A large number of compositions in accordance with the invention were produced, with various reactants and reactant ratios being tested. In each of the runs, the composition was made as follows:

In each case (except as noted), a round-bottom stainless steel, jacketed kettle was employed having a mixing element therein. Respective quantities (as set forth in the following tables) of water, adjunct (where used) and cation source were first mixed for a period of about 2 minutes. At this point the phosphate source was added, with additional mixing for about 2 minutes. The organic acid (usually citric) was then added and mixing was continued for about 2 minutes thereafter. During these mixing steps, cold tap water was fed to the kettle jacket to maintain the temperature of the reaction mixture at room temperature or below.

After the initial mixing step was completed, a steam-water mixture was directed to the kettle jacket to begin heating the material therein. Mixing was continued during this step. When the temperature of the mixture reached about 200° F., a steam/water mix was employed to maintain the temperature level, and a final mixing step of about 30 minutes was conducted.

In certain instances the products were homogenized (3500 p.s.i. first stage, 500 p.s.i. second stage or alternately a single stage, 2000 p.s.i.), and thereafter spray dried to yield a powdered product which could be reconstituted in water.

The following legend (Table VII) will facilitate an understanding of Tables VIII and IX hereunder.

The starting materials for the products synthesized in this series of runs are set forth in Table VIII.

A number of the runs identified in Table VIII were analyzed for cations in solution, in order to determine the dispersability of the resultant compounds in aqueous media. Cations in solution were determined by atomic absorption techniques using conventional procedures.

The results of this series of tests are set forth in the following Table IX. In addition, alkali metal reactant ratios are given in the table along with theoretical efficiencies (i.e., actual cations in solution divided by theoretically available cations).

In the case of formulae Nos. 40, 85 and 90, higher temperatures and pressures were used. Specifically, in formula 40, the reaction was carried out at about 375° F., 170 p.s.i.; formula 85 at about 360°-375° F., 150-170 p.s.i.; and formula 89 at about 350°-370° F., 120-160 p.s.i.

TABLE VII

MINERAL COMPOSITIONS
LEGEND

| | | | | | | | |
|---|---|---|---|---|---|---|---|
| A | = | Ca(OH)$_2$ | A$_1$ | = | Na$_2$HPO$_4$ | A$_2$ | = Dextrose |
| D | = | Mg(OH)$_2$ | D$_1$ | = | ZnCO$_3$ | D$_2$ | = K$_3$PO$_4$ |
| E | = | FeCl$_3$. 6H$_2$O | E$_1$ | = | ZnO | E$_2$ | = KCl |
| G | = | FeCO$_3$ Saccharated | G$_1$ | = | LiOH . H$_2$O | G$_2$ | = Phosphorus acid |
| J | = | FeHO$_2$ | J$_1$ | = | Cu(OH)$_2$ | J$_2$ | = Metaphosphoric acid |
| L | = | Fe$_2$(SO$_4$)$_3$ . xH$_2$O | L$_1$ | = | Cu Gluconate | L$_2$ | = Ni(OH)$_2$ |
| M | = | FeNH$_4$ . Citrate | M$_1$ | = | ZnCl$_2$ | M$_2$ | = Mercuric Oxide Red |
| Q | = | CuCl$_2$ . 2H$_2$O | Q$_1$ | = | Zn Gluconate | Q$_2$ | = Nitrilotriacetic acid |
| R | = | H$_3$BO$_3$ | R$_1$ | = | Molybdic Acid 85% | R$_2$ | = Glycerin |
| S | = | ZnSO$_4$ . 7H$_2$O | S$_1$ | = | KOH | S$_2$ | = Sucrose |
| T | = | MnSO$_4$ . H$_2$O | T$_1$ | = | H$_3$PO$_4$ 85% | T$_2$ | = Gluconic Acid 50% |
| X | = | MoO$_3$ | X$_1$ | = | KH$_2$PO$_4$ | X$_2$ | = Glycolic Acid |
| Y | = | Mn(NO$_3$)$_2$ . 4H$_2$O | Y$_1$ | = | EDTA | Y$_2$ | = Diethylene triamine Pentaacetic Acid Pentasodium Salt, 41% |
| Z | = | Cu(NO$_3$)$_2$ . 3H$_2$O | Z$_1$ | = | Corn Syrup Solids 36 DE | | |

TABLE VIII

MINERAL COMPOSITIONS

| Formula Number | pH | Percent[1] Solids | K$_2$HPO$_4$[2] | Other Phosphate Sources | Other Potassium Sources | Cation[3] Sources | | Anhydrous Citric Acid | Other Acids | Adjuncts[4] |
|---|---|---|---|---|---|---|---|---|---|---|
| 1 | 6.46 | 19.84 | 4.8 | — | — | A | 3.7 | 3.6 | — | — |
| | | | | | | D | 2.4 | | | |
| | | | | | | E | .11 | | | |
| 2 | 6.5 | 19.73 | 3.2 | — | — | A | 2.5 | 2.3 | — | Z$_1$ 33.79 |
| | | | | | | D | 1.67 | | | |
| | | | | | | E | .11 | | | |
| 3 | 6.65 | 18.652 | 3.2 | — | — | A | 2.48 | 2.4 | — | Z$_1$ 28.90 |
| | | | | | | G | .3% | | | |
| | | | | | | D | 1.62 | | | |
| 4 | 6.35 | 19.64 | 4.8 | — | — | A | 3.7 | 3.6 | — | — |
| | | | | | | D | 2.4 | | | |
| | | | | | | J | .11 | | | |
| 5 | 6.10 | 19.74 | 4.8 | — | — | A | 3.7 | 3.6 | — | — |
| | | | | | | D | 2.4 | | | |
| | | | | | | L | .05 | | | |
| 6 | 6.30 | 19.84 | 4.8 | — | — | A | 3.7 | 3.6 | — | — |
| | | | | | | D | 2.4 | | | |
| | | | | | | M | .3% | | | |
| 7 | 5.60 | 14.36 | 3.2 | — | — | A | 2.5 | 1.0 | — | — |
| | | | | | | D | 1.67 | | | |
| | | | | | | E | 1.5 | | | |
| 8 | 5.70 | 23.04 | 4.8 | — | — | A | 3.7 | 3.4 | — | — |
| | | | | | | D | 2.4 | | | |
| | | | | | | L | 1.0 | | | |
| 9 | 4.90 | 14.16 | 4.5 | — | — | J | 2.25 | 2.25 | — | — |
| 10 | 7.05 | 27.16 | 10.28 | — | — | D | 5.14 | 3.25 | — | — |
| 11 | 6.70 | 19.54 | 4.8 | — | — | A | 3.7 | 3.49 | — | — |
| | | | | | | D | 2.4 | | | |
| | | | | | | Q | .18 | | | |
| 12 | 6.95 | 19.54 | 4.8 | — | — | A | 3.7 | 3.44 | — | — |
| | | | | | | D | 2.4 | | | |
| | | | | | | R | .65 | | | |
| 13 | 7.40 | 19.34 | 4.8 | — | — | A | 3.7 | 3.40 | — | — |
| | | | | | | D | 2.4 | | | |
| | | | | | | S | .1 | | | |
| 14 | 7.30 | 19.34 | 4.8 | — | — | A | 3.7 | 3.40 | — | — |
| | | | | | | D | 2.4 | | | |
| | | | | | | T | .18 | | | |
| 15 | 6.95 | 19.34 | 4.8 | — | — | A | 3.7 | 3.40 | — | — |
| | | | | | | D | 2.4 | | | |
| | | | | | | X | .21 | | | |
| 16 | 6.80 | 20.04 | 4.8 | — | — | A | 3.7 | 3.40 | — | — |
| | | | | | | D | 2.4 | | | |
| | | | | | | Y | .28 | | | |
| 17 | 5.50 | 22.76 | 4.8 | — | — | A | 2.5 | 3.40 | — | — |
| | | | | | | D | 4.1 | | | |
| | | | | | | L | .9 | | | |
| 18 | 4.20 | 16.11 | — | T$_1$ 2.0 | S$_1$ 8.0 | A | 2.0 | 2.00 | — | — |
| | | | | | | L | 1.0 | | | |
| 19 | 4.40 | 19.31 | — | T$_1$ 2.0 | S$_1$ 8.0 | A | 2.0 | 2.00 | — | Z$_1$ 16.57 |

TABLE VIII-continued

MINERAL COMPOSITIONS

| Formula Number | pH | Percent[1] Solids | $K_2HPO_4$[2] | Other Phosphate Sources | Other Potassium Sources | Cation[3] Sources | | Anhydrous Citric Acid | Other Acids | Adjuncts[4] |
|---|---|---|---|---|---|---|---|---|---|---|
| 20 | 6.20 | 24.84 | 4.8 | — | — | S | 1.0 | 3.60 | — | $Z_1$ 20.00 |
|  |  |  |  |  |  | A | 3.7 |  |  |  |
|  |  |  |  |  |  | D | 2.4 |  |  |  |
|  |  |  |  |  |  | E | .11 |  |  |  |
| 21 | 7.55 | 22.53 | 4.8 | — | — | A | 3.7 | 3.10 | — | $Z_1$ 17.26 |
|  |  |  |  |  |  | D | 2.4 |  |  |  |
|  |  |  |  |  |  | J | .11 |  |  |  |
| 22 | 7.60 | 22.49 | 4.8 | — | — | A | 3.7 | 3.10 | — | $Z_1$ 16.68 |
|  |  |  |  |  |  | D | 2.4 |  |  |  |
|  |  |  |  |  |  | L | .05 |  |  |  |
| 23 | 6.90 | 23.21 | 4.8 | — | — | A | 3.7 | 3.40 | — | $Z_1$ 16.68 |
|  |  |  |  |  |  | D | 2.4 |  |  |  |
|  |  |  |  |  |  | Q | .18 |  |  |  |
| 24 | 6.95 | 22.85 | 4.8 | — | — | A | 3.7 | 3.20 | — | $Z_1$ 16.67 |
|  |  |  |  |  |  | D | 2.4 |  |  |  |
|  |  |  |  |  |  | S | .1 |  |  |  |
| 25 | 6.90 | 22.97 | 4.8 | — | — | A | 3.7 | 3.30 | — | $Z_1$ 16.68 |
|  |  |  |  |  |  | D | 2.4 |  |  |  |
|  |  |  |  |  |  | T | .18 |  |  |  |
| 26 | 7.0 | 22.97 | 4.8 | — | — | A | 3.7 | 3.30 | — | $Z_1$ 16.68 |
|  |  |  |  |  |  | D | 2.4 |  |  |  |
|  |  |  |  |  |  | X | .21 |  |  |  |
| 27 | 6.0 | 10.72 | 2.6 | — | — | A | 2.0 | — | dl-Malic 2.98 | — |
|  |  |  |  |  |  | D | 1.3 |  |  |  |
| 28 | 6.2 | 11.08 | 2.6 | — | — | A | 2.0 | — | Adipic 3.00 | — |
|  |  |  |  |  |  | D | 1.3 |  |  |  |
| 29 | 6.1 | 12.45 | 2.6 | — | — | A | 2.0 | — | Hydrochloric 5.00 | — |
|  |  |  |  |  |  | D | 1.3 |  |  |  |
| 30 | 5.85 | 13.04 | 2.6 | — | — | A | 2.0 |  | Lactic 5.97 | — |
|  |  |  |  |  |  | D | 1.3 |  |  |  |
| 31 | 6.35 | 20.00 | 4.8 | — | — | A | 3.7 | 3.75 | — | — |
|  |  |  |  |  |  | D | 2.4 |  |  |  |
| 32 | 6.30 | 29.31 | 4.8 | — | — | A | 3.7 | 3.60 | — | $Z_1$ 33.33 |
|  |  |  |  |  |  | D | 2.4 |  |  |  |
| 33 | 8.60 | 19.62 | 4.8 | — | — | A | 3.7 | — | Oxalic 5.60 .2H$_2$O | — |
|  |  |  |  |  |  | D | 2.4 |  |  |  |
| 34 | 5.70 | 19.06 | 4.8 | — | — | A | 3.7 | — | Fumaric 5.60 | — |
|  |  |  |  |  |  | D | 2.4 |  |  |  |
| 35 | 6.85 | 29.40 | 10.28 | — | — | A | 5.14 | 3.97 | — | — |
| 36 | 6.50 | 17.19 | 4.0 | — | $S_1$ 3.3 | Z | 2.0 | 2.00 | — | — |
| 37 | 6.10 | 19.50 | 7.2 | — | — | A | 3.0 | 1.98 | — | — |
|  |  |  |  |  |  | $L_1$ | .3 |  |  |  |
|  |  |  |  |  |  | $M_1$ | .3 |  |  |  |
| 38 | 6.80 | 18.93 | 6.6 | — | — | D | 3.0 | 1.90 | Molybdic 0.5% | — |
|  |  |  |  |  |  | $Q_1$ | .3 |  |  |  |
| 39 | 7.10 | 14.27 | 5.0 | — | — | A | 2.5 | 1.93 | — | — |
| 40 | 4.50 | 15.42 | — | $T_1$ 1.0 | $S_1$ 1.0 | A | 2.5 | 1.00 | — | — |
| 41 | 6.60 | 14.43 | 4.0 | — | — | A | 1.0 | 2.00 | — | — |
|  |  |  |  |  |  | S | 1.0 |  |  |  |
| 42 | 6.3 | 10.00 | — | $T_1$ 1.0 | $S_1$ 2.0 | A | 2.5 | .64 | — | — |
| 43 | 6.5 | 14.86 | 4.0 | — | — | D | 4.0 | 2.0 | — | — |
|  |  |  |  |  |  | X | 2.0 |  |  |  |
| 44 | 12.5 | 12.69 | 1.0 | — | — | A | 7.0 | 3.0 | — | — |
| 45 | 10.5 | 10.85 | 3.0 | — | — | A | 5.0 | 1.0 | — | — |
| 46 | 4.5 | 5.15 | — | $T_1$ 2.0 | — | A | 5.0 | — | $Y_1$ 1.0 | — |
| 47 | 5.0 | 5.38 | — | $T_1$ 4.0 | — | A | 8.0 | — | $Y_1$ 1.0 | — |
| 48 | 3.7 | 4.70 | — | $T_1$ 2.0 | — | A | 4.0 | — | $Y_1$ 1.0 | — |
| 49 | 8.15 | 9.31 | — | $T_1$ 3.0 | — | A | 6.0 | 1.0 | — | — |
| 50 | 6.10 | 5.12 | — | $T_1$ 1.0 | — | A | 3.0 | 1.0 | — | — |
| 51 | 5.30 | 5.05 | — | $T_1$ 4.0 | — | A | 9.0 | 2.0 | — | — |
| 52 | 5.16 | 4.99 | — | $T_1$ 1.4 | — | A | 6.3 | 2.8 | — | — |
| 53 | 5.25 | 9.98 | — | $T_1$ 1.4 | — | A | 5.6 | 1.4 | Oxalic 1.4 | — |
| 54 | 5.70 | 9.13 | — | $T_1$ 1.0 | — | A | 5.0 | 1.0 | Oxalic 2.0 | — |
| 55 | 8.30 | 11.06 | — | $T_1$ 2.4 | — | A | 6.6 | 1.2 | Oxalic 1.2 | — |
| 56 | 7.50 | 20.94 | — | $T_1$ 3.0 | — | A | 6.0 | 1.0 | — | $Z_1$ 50.0 |
| 57 | 6.10 | 10.25 | — | $T_1$ 1.0 | — | A | 3.0 | 1.0 | — | $Z_1$ 50.0 |
| 58 | 6.65 | 16.58 | — | $T_1$ 4.0 | — | A | 9.0 | 2.0 | — | $Z_1$ 50.0 |
| 59 | 5.60 | 22.84 | — | $T_1$ 1.4 | — | A | 6.3 | 2.8 | — | $Z_1$ 50.0 |
| 60 | 6.60 | 10.07 | — | $T_1$ 2.0 | $S_1$ 1.0 | A | 5.0 | 2.0 | — | — |
| 61 | 7.70 | 11.01 | — | $T_1$ 2.0 | $S_1$ 4.0 | A | 4.0 | 2.0 | — | — |
| 62 | 7.10 | 11.26 | — | $T_1$ 1.5 | $S_1$ 3.0 | A | 4.5 | 1.5 | Oxalic 1.5 | — |
| 63 | 6.80 | 20.14 | — | $T_1$ 2.0 | $S_1$ 1.0 | A | 5.0 | 2.0 | — | $Z_1$ 50.0 |
| 64 | 8.25 | 8.17 | — | $T_1$ 2.0 | $S_1$ 5.0 | A | 2.0 | 1.0 | — | — |
| 65 | 7.50 | 7.79 | — | $T_1$ 2.0 | $S_1$ 3.0 | A | 3.0 | 1.0 | — | — |
| 66 | 7.30 | 7.41 | — | $T_1$ 2.0 | $S_1$ 1.0 | A | 4.0 | 1.0 | — | — |
| 67 | 6.90 | 22.02 | — | $T_1$ 2.0 | $S_1$ 4.0 | A | 4.0 | 2.0 | — | $Z_1$ 50.0 |

TABLE VIII-continued

MINERAL COMPOSITIONS

| Formula Number | pH | Percent[1] Solids | $K_2HPO_4$[2] | Other Phosphate Sources | Other Potassium Sources | Cation[3] Sources | | Anhydrous Citric Acid | Other Acids | Adjuncts[4] |
|---|---|---|---|---|---|---|---|---|---|---|
| 68 | 9.90 | 16.34 | — | $T_1$ 2.0 | $S_1$ 5.0 | A | 2.0 | 1.0 | — | $Z_1$ 50.0 |
| 69 | 7.30 | 15.57 | — | $T_1$ 2.0 | $S_1$ 3.0 | A | 3.0 | 1.0 | — | $Z_1$ 50.0 |
| 70 | 7.30 | 14.81 | — | $T_1$ 2.0 | $S_1$ 1.0 | A | 4.0 | 1.0 | — | $Z_1$ 50.0 |
| 71 | 6.90 | 22.02 | — | $T_1$ 2.0 | $S_1$ 4.0 | A | 4.0 | 2.0 | — | — |
| 72 | 6.80 | 6.39 | — | $T_1$ 2.0 | $S_1$ 2.0 | A | 4.0 | — | $Y_1$ 1.0 | — |
| 73 | 10.50 | 4.73 | — | $T_1$ 2.0 | $S_1$ 2.0 | A | 2.0 | — | — | — |
| 74 | 7.00 | 6.61 | — | — | $S_1$ 2.0 | A | 2.0 | 2.0 | — | — |
| 75 | 6.10 | 5.67 | — | $T_1$ 1.0 | $S_1$ 2.0 | A | 2.0 | 1.0 | — | — |
| 76 | 10.10 | 5.15 | 1.0 | — | — | A | 2.0 | 1.0 | — | — |
| 77 | 8.90 | 6.95 | 1.0 | — | — | A | 2.0 | 1.0 | — | $A_2$ 1.0 |
| 78 | 5.20 | 4.76 | — | $X_1$ 1.0 | — | A | 2.0 | 1.0 | — | — |
| 79 | 4.85 | 6.57 | — | $X_1$ 1.0 | — | A | 2.0 | 1.0 | — | $A_2$ 1.0 |
| 80 | 5.4 | 20.21 | 4.6 | — | — | A | 4.7 | 4.6 | — | — |
| 81 | 5.0 | 15.16 | 3.4 | — | — | A | 3.5 | 3.4 | — | — |
| 82 | 5.9 | 10.00 | 6.5 | — | — | A | 3.3 | 3.3 | — | — |
| 83 | 13.1 | 12.5 | — | — | $D_2$ 2.6 | A | 2.6 | 1.3 | — | — |
| 84 | 5.8 | 12.5 | — | — | $D_2$ 2.6 | A | 2.6 | 2.6 | — | — |
| 85 | 8.6 | 13.8 | — | — | $D_2$ 4.0 | A | 2.0 | 2.0 | — | — |
| 86 | 4.15 | 9.77 | — | $T_1$ 1.0 | $E_2$ 6.0 | A | 3.0 | 1.0 | — | — |
| 87 | 6.9 | 12.11 | — | $T_1$ 2.0 | $S_1$ 8.0 | A | 2.0 | 2.0 | — | — |
| 88 | 6.1 | 20.00 | 4.8 | — | — | A | 3.7 | 3.9 | — | — |
|  |  |  |  |  |  | D | 2.4 |  |  |  |
| 89 | 7.0 | 24.77 | 3.2 | — | — | A | 2.5 | 2.3 | — | $Z_1$ 39.22 |
|  |  |  |  |  |  | D | 1.6 |  |  |  |
|  |  |  |  |  |  | E | 0.11 |  |  |  |
| 90 | 11.0 | 5.15 | 1.0 | — | — | A | 2.0 | 1.0 | — | — |
| 91 | 11.0 | 5.15 | 1.0 | — | — | A | 2.0 | 1.0 | — | — |
| 92 | 11.0 | 5.15 | 1.0 | — | — | A | 2.0 | 1.0 | — | — |
| 93 | 11.0 | 5.15 | 1.0 | — | — | A | 2.0 | 1.0 | — | — |
| 94 | 9.4 | 4.91 | — | $A_1$ 1.0 | — | A | 2.0 | 1.0 | — | — |
| 95 | 10.0 | 5.25 | 1.0 | — | — | A | 2.0 | — | $Q_2$ 1.0 | — |
| 96 | 6.7 | 6.22 | 1.0 | — | — | $D_1$ | 2.0 | 1.0 | — | — |
| 97 | 6.4 | 5.34 | 1.0 | — | — | $E_1$ | 2.0 | 1.0 | — | — |
| 98 | 2.8 | 7.09 | 1.0 | — | — | T | 2.0 | 1.0 | — | — |
| 99 | 9.05 | 6.19 | 1.0 | — | — | A | 2.0 | 1.0 | — | $R_2$ 1.0 |
| 100 | 8.7 | 5.15 | 1.0 | — | — | A | 2.0 | 1.0 | — | — |
| 101 | 8.3 | 5.15 | 1.0 | — | — | A | 2.0 | 1.0 | — | — |
| 102 | 8.15 | 7.97 | 1.0 | — | — | A | 2.0 | 1.0 | — | $S_2$ 1.0 |
| 103 | 8.4 | 4.14 | — | — | — | $G_1$ | 2.0 | 1.0 | $T_1$ 1.0 | — |
|  |  |  |  |  |  | A | 2.0 |  |  |  |
| 104 | 10.35 | 8.58 | — | — | — | A | 2.0 | — | $T_1$ 1.0 | $A_2$ 1.0 |
|  |  |  |  |  |  |  |  |  | $Y_2$ 1.0 |  |
| 105 | 9.6 | 6.07 | — | — | $S_1$ 1.0 | A | 2.0 | — | $T_1$ 1.0 | $A_2$ 1.0 |
|  |  |  |  |  |  |  |  |  | $T_2$ 2.0 |  |
| 106 | 8.3 | 5.45 | — | $X_1$ 1.0 | — | A | 2.0 | — | $X_2$ 2.0 | $A_2$ 1.0 |
| 107 | 1.65 | 3.83 | — | — | — | J | 2.0 | 1.0 | $T_1$ 1.0 | $A_2$ 1.0 |
| 108 | 2.1 | 10.33 | 1.0 | — | — | S | 2.0 | 1.0 | — | $R_2$ 1.0 |
| 109 | 4.35 | 6.70 | 1.0 | — | — | $J_1$ | 2.0 | 1.0 | — | $A_2$ 1.0 |
| 110 | 2.8 | 4.88 | 0.5 | — | — | Y | 1.0 | 0.5 | — | $A_2$ 0.5 |
| 111 | 7.9 | 6.59 | — | $G_2$ 1.0 | $S_1$ 1.0 | A | 2.0 | 1.0 | — | $A_2$ 1.0 |
| 112 | 8.4 | 6.75 | — | $J_2$ 1.0 | $S_1$ 1.0 | A | 2.0 | 1.0 | — | $A_2$ 1.0 |
| 113 | 5.75 | 7.32 | 1.0 | — | — | $L_2$ | 2.0 | 1.0 | — | $A_2$ 1.0 |
| 114 | 3.95 | 4.90 | 0.5 | — | — | $M_2$ | 1.0 | 0.5 | — | $A_2$ 0.5 |

[1] Data given in percent by weight of total composition; % by weight water = 100% − percent solids
[2] All other component data, save for corn syrup, given in moles
[3] Letter designation refers to code given in Table VII; numerical data refers to moles of particular compound used
[4] Adjuncts designation refers to code given in Table VII

TABLE IX

| Formula No. | $PO_4$/Acid Ratios | Alkali Metal/ $PO_4$ Ratios | Non-alkali Metal Cation/$PO_4$ Ratios | Non-Alkali Metal Cation/Acid Ratios | Percent of Theoretical Cations in Solution | | | |
|---|---|---|---|---|---|---|---|---|
|  |  |  |  |  | % Ca | % Mg | % Fe | % Others |
| 1 | 1.33:1 | 2:1 | 1.29:1 | 1.72:1 | 75.9 | 97.6 | 83.9 | — |
| 2 | 1.39:1 | 2:1 | 1.33:1 | 1.86:1 | 87.3 | 95.0 | 94.0 | — |
| 3 | 1.33:1 | 2:1 | 1.32:1 | 1.76:1 | 84.4 | — | 123.7 | — |
| 4 | 1.33:1 | 2:1 | 1.29:1 | 1.73:1 | 103.9 | — | 31.3 | — |
| 5 | 1.33:1 | 2:1 | 1.28:1 | 1.71:1 | 101.9 | 100.0 | 89.3 | — |
| 6[1,2,7] | 1.33:1 | 2:1 | 1.28:1 | 1.71:1 | Not assayed | | | |
| 7[1] | 3.20:1 | 2:1 | 1.77:1 | 5.67:1 | — | — | 1.6 | — |
| 8 | 1.41:1 | 2:1 | 1.48:1 | 2.1:1 | — | — | 33.0 | — |
| 9[1] | 2.00:1 | 2:1 | .5:1 | 1:1 | — | — | 14.9 | — |
| 10 | 3.16:1 | 2:1 | .5:1 | 1.58:1 | — | 65.1 | — | — |
| 11 | 1.38:1 | 2:1 | 1.31:1 | 1.80:1 | — | — | — | 105.3 Cu |
| 12 | 1.40:1 | 2:1 | 1.41:1 | 1.96:1 | 36.6 | — | — | 88.9 B |
| 13[2] | 1.41:1 | 2:1 | 1.29:1 | 1.82:1 | — | — | — | 5.0 Zn |

TABLE IX-continued

| Formula No. | PO4/Acid Ratios | Alkali Metal/ PO4 Ratios | Non-alkali Metal Cation/PO4 Ratios | Non-Alkali Metal Cation/Acid Ratios | Percent of Theoretical Cations in Solution | | | |
|---|---|---|---|---|---|---|---|---|
| | | | | | % Ca | % Mg | % Fe | % Others |
| 14[2] | 1.41:1 | 2:1 | 1.31:1 | 1.85:1 | — | — | — | 10.0 Mn |
| 15 | 1.41:1 | 2:1 | 1.31:1 | 1.86:1 | — | — | — | 46.6 Mo |
| 16[2] | 1.41:1 | 2:1 | 1.33:1 | 1.88:1 | — | — | — | 7.8 Mn |
| 17 | 1.41:1 | 2:1 | 1.56:1 | 2.21:1 | 63.8 | 79.7 | 24.6 | — |
| 18 | 1.15:1 | 4:1 | 1.05:1 | 1:1 | 84.3 | — | 80.8 | — |
| 19 | 1.15:1 | 4:1 | 1.05:1 | 1.05:1 | 106.0 | — | 74.4 | — |
| 20 | 1.33:1 | 2:1 | 1.29:1 | 1.73:1 | 101.5 | — | 108.0 | — |
| 21[1,2,7] | 1.55:1 | 2:1 | 1.29:1 | 2.0:1 | Not assayed | | | |
| 22[1,2,7] | 1.55:1 | 2:1 | 1.28:1 | 1.98:1 | Not assayed | | | |
| 23 | 1.41:1 | 2:1 | 1.31:1 | 1.85:1 | — | — | — | 103.5 Cu |
| 24 | 1.50:1 | 2:1 | 1.29:1 | 1.94:1 | — | — | — | 47.0 Zn |
| 25 | 1.45:1 | 2:1 | 1.31:1 | 1.90:1 | — | — | — | 39.8 Mn |
| 26 | 1.45:1 | 2:1 | 1.31:2 | 1.91:1 | — | — | — | 44.8 Mo |
| 27[3] | 0.872:1 | 2:1 | 1.27:1 | 1.11:1 | 4.7 | — | — | — |
| 27A[3] | 0.872:1 | 2:1 | 1.27:1 | 1.11:1 | 4.7 | — | — | — |
| 28[3] | 0.87:1 | 2:1 | 1.27:1 | 1.1:1 | 10.8 | — | — | — |
| 29[3] | 0.52:1 | 2:1 | 1.27:1 | .55:1 | 0.8 | — | — | — |
| 30[3,7] | 0.436:1 | 2:1 | 1.27:1 | .55:1 | Not assayed | | | |
| 31 | 1.28:1 | 2:1 | 1.27:1 | 1.63:1 | 103.2 | 100.0 | — | — |
| 31A | 1.28:1 | 2:1 | 1.27:1 | 1.63:1 | 100.5 | 100.0 | — | — |
| 32 | 1.33:1 | 2:1 | 1.27:1 | 1.69:1 | 106.1 | 104.0 | — | — |
| 33[3] | 0.857:1 | 2:1 | 1.27:1 | 1.09:1 | 9.2 | — | — | — |
| 34[3] | 0.857:1 | 2:1 | 1.27:1 | 1.09:1 | 8.3 | — | — | — |
| 35 | 2.59:1 | 2:1 | 0.5:1 | 1.29:1 | 29.9 | — | — | — |
| 36 | 2.00:1 | 3:1 | 0.5:1 | 1:1 | — | — | — | 100.8 Cu |
| 37 | 3.64:1 | 2:1 | 0.5:1 | 1.82:1 | 58.4 | — | — | 187.8 Cu 28.7 Zn |
| 38 | 3.47:1 | 2:1 | 0.5:1 | 1.74:1 | — | 49.4 | — | 7.6 Zn 106.0 Mo |
| 39[2] | 2.59:1 | 2:1 | 0.5:1 | 1.30:1 | 15.7 | — | — | — |
| 40[2] | 1.00:1 | 1:1 | 2.5:1 | 2.5:1 | 18.6 | — | — | — |
| 41 | 2.00:1 | 2:1 | .5:1 | 23.81:1 | 37.5 | — | — | 3.3 Zn |
| 42[1] | 1.56:1 | 2:1 | 2.5:1 | 3.91:1 | 8.8 | — | — | — |
| 43 | 2.00:1 | 2:1 | 1.5:1 | 3:1 | — | 122.0 | — | 92.1 Mo |
| 44[1] | 0.33:1 | 2:1 | 7:1 | 2.33:1 | 21.7 | — | — | — |
| 45 | 3.00:1 | 2:1 | 1.67:1 | 5:1 | 86.6 | — | — | — |
| 46 | 2.00:1 | 2:1 | 2.5:1 | 5:1 | 44.6 | — | — | — |
| 47 | 4.00:1 | 2:1 | 2:1 | 8:1 | 24.0 | — | — | — |
| 48 | 2.00:1 | 2:1 | 2:1 | 4:1 | 68.5 | — | — | — |
| 49[1,4] | 3.00:1 | 2:1 | 2:1 | 6:1 | 8.1 | — | — | — |
| 50[1,4] | 1.00:1 | 2:1 | 2:1 | 6:1 | 9.4 | — | — | — |
| 51[2,4] | 2.00:1 | 2:1 | 2.25:1 | 4.5:1 | 8.8 | — | — | — |
| 52[2,4] | 0.50:1 | 2:1 | 4.5:1 | 2.25:1 | 9.9 | — | — | — |
| 53[3,4] | 0.50:1 | 2:1 | 4:1 | 2:1 | 9.3 | — | — | — |
| 54[3] | 0.33:1 | 2:1 | 5:1 | 1.67:1 | 9.6 | — | — | — |
| 55[3] | 1.00:1 | 2:1 | 2.75:1 | 2.75:1 | 1.0 | — | — | — |
| 56[1,4] | 3.00:1 | 2:1 | 2:1 | 6:1 | 0.4 | — | — | — |
| 57[1,4] | 1.00:1 | 2:1 | 3:1 | 3:1 | 16.5 | — | — | — |
| 58[1,4,7] | 2.00:1 | 2:1 | 2.25:1 | 4.5:1 | Not Assayed | | | |
| 59[1,4] | 0.50:1 | 2:1 | 4.5:1 | 2.25:1 | 18.9 | — | — | — |
| 60[2] | 1.00:1 | 0.5:1 | 2.5:1 | 2.5:1 | 29.5 | — | — | — |
| 61 | 1.00:1 | 2:1 | 2:1 | 2:1 | 98.9 | — | — | — |
| 62 | 0.50:1 | 2:1 | 3:1 | 1.5:1 | 42.3 | — | — | — |
| 63 | 1.00:1 | 0.5:1 | 2.5:1 | 2.5:1 | 73.4 | — | — | — |
| 64[2] | 2.00:1 | 2.5:1 | 1:1 | 2:1 | 2.8 | — | — | — |
| 65 | 2.00:1 | 1.5:1 | 1.5:1 | 3:1 | 34.3 | — | — | — |
| 66[2] | 2.00:1 | 0.5:1 | 2:1 | 4:1 | 22.2 | — | — | — |
| Corrected for H2O | | | | | | | | |
| 66A[1] | 2.00:1 | 0.5:1 | 2:1 | 2:1 | .9 | — | — | — |
| 67 | 1.00:1 | 2:1 | 2:1 | 2:1 | 105.4 | — | — | — |
| 68[1,2,5] | 2.00:1 | 2.5:1 | 1:1 | 2:1 | 1.6 | — | — | — |
| 68A[1,2,5] | 2.00:1 | 2.5:1 | 1:1 | 2:1 | 1.6 | — | — | — |
| 69 | 2.00:1 | 1.5:1 | 1.5:1 | 3:1 | 53.1 | — | — | — |
| 70[1,5] | 2.00:1 | 0.5:1 | 2:1 | 4:1 | 28.1 | — | — | — |
| 71 | 1.00:1 | 2:1 | 2:1 | 2:1 | 117.5 | — | — | — |
| 72[1,2] | 2.00:1 | 1:1 | 2:1 | 4:1 | 22.2 | — | — | — |
| 73[1,6,7] | 0 | 1:1 | 1:1 | 0 | Not Assayed | | | |
| 74[1,6,7] | 0 | 0 | 0 | 1:1 | Not Assayed | | | |
| 75 | 1.00:1 | 2:1 | 2:1 | 2:1 | 29.67 | — | — | — |
| 76 | 1.00:1 | 2:1 | 2:1 | 2:1 | 87.6 | — | — | — |
| 77 | 1.00:1 | 2:1 | 2:1 | 2:1 | 114.2 | — | — | — |
| 78 | 1.00:1 | 1:1 | 2:1 | 2:1 | 39.4 | — | — | — |
| 79 | 1.00:1 | 1:1 | 2:1 | 2:1 | 78.6 | — | — | — |
| 80 | 1.00:1 | 2:1 | 1:1 | 1:1 | 138.5 | — | — | — |
| 81 | 1.00:1 | 2:1 | 1:1 | 1:1 | 128.8 | — | — | — |
| 82 | 2.00:1 | 2:1 | .508:1 | 1:1 | 120.8 | — | — | — |
| 83 | 2.00:1 | 3:1 | 1:1 | 1:1 | 103.8 | — | — | — |
| 84 | 1.00:1 | 3:1 | 1:1 | 1:1 | 102.6 | — | — | — |

TABLE IX-continued

| Formula No. | PO4/Acid Ratios | Alkali Metal/ PO4 Ratios | Non-alkali Metal Cation/PO4 Ratios | Non-Alkali Metal Cation/Acid Ratios | Percent of Theoretical Cations in Solution | | | |
|---|---|---|---|---|---|---|---|---|
| | | | | | % Ca | % Mg | % Fe | % Others |
| 85 | 2.00:1 | 3:1 | .5:1 | 1:1 | 82.6 | — | — | — |
| 86 | 1.00:1 | 6:1 | 3:1 | 3:1 | 72.6 | — | — | — |
| 87 | 1.00:1 | 4:1 | 1:1 | 1:1 | 52.9 | — | — | — |
| 88 | 1.23:1 | 2:1 | 1.27:1 | 1.56:1 | 138.2 | — | — | — |
| 89 | 1.39:1 | 2:1 | 1.32:1 | 1.83:1 | 103.6 | 105.0 | 118.8 | — |
| 90 | 1.00:1 | 2:1 | 2:1 | 2:1 | 95.5 | — | — | — |
| 91 | 1.00:1 | 2:1 | 2:1 | 2:1 | 84.1 | — | — | — |
| 92 | 1.00:1 | 2:1 | 2:1 | 2:1 | 142.9 | — | — | — |
| 93 | 1.00:1 | 2:1 | 2:1 | 2:1 | 195.7 | — | — | — |
| 94 | 1.00:1 | 2:1 | 2:1 | 2:1 | 109.4 | — | — | 155.3 Na |
| 95 | 1.00:1 | 2:1 | 2:1 | 2:1 | 76.6 | — | — | — |
| 96 | 1.00:1 | 2:1 | 2:1 | 2:1 | — | — | — | 50.0 Zn |
| 97 | 1.00:1 | 2:1 | 2:1 | 2:1 | — | — | — | 40.0 Zn |
| 98 | 1.00:1 | 2:1 | 2:1 | 2:1 | — | — | — | 88.8 Mn |
| 99 | 1.00:1 | 2:1 | 2:1 | 2:1 | 140.3 | — | — | — |
| 100 | 1.00:1 | 2:1 | 2:1 | 2:1 | 101.8 | — | — | — |
| 101 | 1.00:1 | 2:1 | 2:1 | 2:1 | 129.5 | — | — | — |
| 102 | 1.00:1 | 2:1 | 2:1 | 2:1 | 111.2 | — | — | — |
| 103 | 1.00:1 | 2:1 | 2:1 | 2:1 | 110.3 | — | — | — |
| 104 | 1.00:1 | 5:1 | 2:1 | 2:1 | 48.9 | — | — | — |
| 105[3] | 0.50:1 | 1:1 | 2:1 | 1:1 | 1.1 | — | — | — |
| 106[3] | 0.50:1 | 1:1 | 2:1 | 1:1 | 16.1 | — | — | — |
| 107 | 1.00:1 | 0 | 2:1 | 2:1 | — | — | 12.5 | — |
| 108 | 1.00:1 | 2:1 | 2:1 | 2:1 | — | — | — | 113.8 Zn |
| 109 | 1.00:1 | 2:1 | 2:1 | 2:1 | — | — | — | 60.8 Cu |
| 110 | 1.00:1 | 2:1 | 2:1 | 2:1 | — | — | — | 134.0 Mn |
| 111 | 1.00:1 | 1:1 | 2:1 | 2:1 | 15.16 | — | — | — |
| 112 | 1.00:1 | 1:1 | 2:1 | 2:1 | 23.00 | — | — | — |
| 113 | 1.00:1 | 2:1 | 2:1 | 2:1 | — | — | — | 41.33 Ni |
| 114 | 1.00:1 | 2:1 | 2:1 | 2:1 | — | — | — | 5.91 Hg |

As noted above, compositions in accordance with the invention should preferably exhibit an aqueous dispersibility such that at least about 30% by weight of the theoretically available, non-alkali metal cations present are dispersed in water at ambient temperature. A perusal of the data given in Table IX will demonstrate that certain of the formulae (noted with superscripts) do not meet this preferred minimum dispersibility. For sake of completeness and to elucidate the most preferred compositions and starting reagents, the following is pertinent. All formulae marked with a superscript "1" indicate a situation where one or more of the reactant ratios (i.e., PO4/acid, alkali-metal cation/PO4, non-alkali metal cation/PO4 or non-alkali metal cation are less than optimum; formulae marked with a superscript "2" indicate cases where stoichiometric balance between the reactants was not maintained; formulae designated with a superscript "3" indicate use of an improper acid, e.g., a mono- or dicarboxylic acid; superscript "4" denotes cases where no alkali metal ions are present; superscript "5" refers to addition of corn syrup after the reaction is complete, as opposed to initial addition; superscript "6" indicates situations where no acid was added; and "7" indicates a situation where no assay was performed, inasmuch as visual observation of the product indicated low yield.

However, a review of the overall test results unequivocably illustrates the wide variety of compounds produceable by the methods of the instant invention. In most cases (even those under 30% theoretical efficiency), the dispersibility results exceed, by orders of magnitude, typical mineral-containing compounds.

EXAMPLE 8

NON-DAIRY MILK CONTAINING SPRAY DRIED MINERAL ENRICHMENT COMPOSITION

A mineral nutrient composition patterned after the calcium, magnesium and phosphorus composition of whole milk was prepared and spray dried using the following formulation table and the procedure described in Example 7.

TABLE X

| Ingredients | Moles | Wt.-Gms | Temp. °F. | Hold Time (Mins.) |
|---|---|---|---|---|
| Water | | 13,535 | 80 | |
| Corn Syrup 36 D.E. | | 270 | | |
| Sugar | | 250 | | 5 |
| Calcium Hydroxide | 3.14 | 233 | | 3 |
| Magnesium Hydroxide | .57 | 33 | | 3 |
| Dipotassium Phosphate | 1.85 | 323 | | 3 |
| Citric Acid | 1.85 | 356 | 80 | |

The above product was employed in the preparation of a non-dairy milk following the formula and procedure as described below in Table XI.

TABLE XI

| Temp. °F. | Hold Time (Mins.) | Ingredients | % By Weight |
|---|---|---|---|
| 75 | | Water | 83.771399 |
| | 1 | Corn Syrup 36 D.E. | 10.730000 |
| | | Mineral Composition | 1.465000 |
| | | Electrolytic Iron | .000146 |
| | | Zinc Oxide | .000455 |
| 80 | | F.D. & C. Yellow Color | .013000 |
| 140 | 1 | Corn Oil (P/S ratio 4.2) | 3.500000 |
| | | Diacetyl Tartaric Acid | |

TABLE XI-continued

| Temp. °F. | Hold Time (Mins.) | Ingredients | % By Weight |
|---|---|---|---|
| | | Esters of Monoglycerides | .150000 |
| | | Distilled Succinylated Monoglycerides | .120000 |
| 160 | 1 | Hexaglycerol Distearate | .150000 |
| | | Glyceryl Monostearate (52% Alpha) | .060000 |
| | | Potassium Chloride | .037000 |
| 175 | 1 | Milk Flavor | .003000 |

Ten thousand grams of the above were prepared, frozen and submitted to an independent laboratory for mineral analysis. The following results were obtained.

TABLE XII

| Mineral | Mg./100 gm. |
|---|---|
| Calcium | 131.7 |
| Magnesium | 13.5 |
| Potassium | 314.0 |
| Sodium | 50.33 |

The above described results confirm the effectiveness of the mineral enrichment composition to function as a fortification agent in food analogs or any beverage or system wherein it is desirous to incorporate beneficial mineral elements.

Having thus described the invention, what is claimed as new and desired to be secured by Letters Patent is:

1. A composition of matter which includes a moiety of the generalized formula

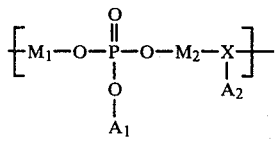

wherein $M_1$ and $M_2$ are polyvalent and respectively taken from the group consisting of calcium, magnesium, iron, copper, boron, manganese, molybdenum, nickel, and zinc, $A_1$ and $A_2$ are respectively taken from the group consisting of hydrogen and the alkali metals, and X is an organic acid moiety having at least three carboxyl groups therein.

2. The composition of matter as set forth in claim 1 wherein $A_1$ and $A_2$ are respectively taken from the group consisting of hydrogen, lithium, potassium and sodium.

3. The composition of matter as set forth in claim 1 wherein said acid moiety is a citrate moiety of the formula

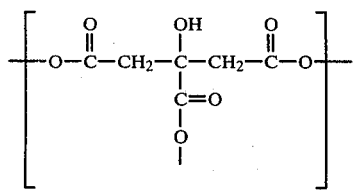

4. The composition of matter as set forth in claim 1 wherein the composition is in the form of a polymer having a molecular weight exceeding 300,000.

5. The composition of matter as set forth in claim 4 wherein said polymer is dispersible in aqueous media.

6. The composition of matter as set forth in claim 1 wherein $M_1$ and $M_2$ are respectively taken from the group consisting of calcium, magnesium, and iron.

7. The composition of matter as set forth in claim 1 wherein at least about 30% by weight of the theoretically available quantities of $M_1$ and/or $M_2$ will remain dispersed in water at ambient temperatures.

8. The composition of matter as set forth in claim 1 including a hydroxyl-containing compound associated with the composition of matter.

9. A water dispersible composition of matter which is a polymer or quasi-polymer having a molecular weight exceeding 300,000 and includes a moiety of the generalized formula

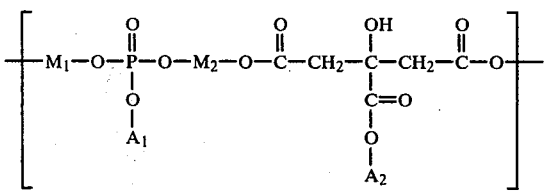

wherein $M_1$ and $M_2$ are polyvalent and respectively taken from the group consisting of calcium, magnesium, iron, copper, boron, zinc, manganese, molybdenum, and nickel, and $A_1$ and $A_2$ are respectively taken from the group consisting of hydrogen and the alkali metals.

10. A method of synthesizing metal-containing products having a high degree of dispersibility in aqueous media, comprising the steps of:

forming an admixture by admixing in an aqueous medium respective quantities of:

(1) a cation source selected from the group consisting of compounds of calcium, magnesium, iron, copper, boron, manganese, molybdenum, nickel, and zinc, (2) an alkali metal phosphate source selected from the group consisting of alkali metal dihydrogen phosphate, dialkali metal phosphate, trialkali metal phosphate, and a mixture of an alkali metal source and phosphoric acid; and (3) an organic acid having at least three carboxyl groups therein, the molar ratios of said reactants being such that the ratio for phosphate ion to acid is from about 0.5:1 to 3:1; for alkali metal ions to phosphate ions, from about 1:1 to 6:1; for non-alkali metal cations to phosphate, from about 0.5:1 to 3:1; for non-alkali metal cations to acid, from about 1:1 to 5:1; and for alkali metal ions to acid, from about 0.5:1 to 7:1;

heating said admixture for a sufficient period of time and at a temperature to yield said products.

11. The method as set forth in claim 10 wherein said cation source is selected from the group consisting of $Ca(OH)_2$, $Mg(OH)_2$, $FeCl_3.6H_2O$, $FeCO_3$ saccharated, $FeHO_2$, $Fe_2(SO_4)_3$, $CuCl_2.2H_2O$, $H_3BO_3$, $ZnSO_4.7H_2O$, $MnSO_4.H_2O$, $MoO_3$, $Mn(NO_3)_2$, $CaO$, $MgO$, $ZnO$, $Cu(NO_3)_2.3H_2O$, $ZnCO_3$, $Cu(OH)_2$, Cu Gluconate, $ZnCl_2$, Zn Gluconate, Molybdic Acid, and $Ni(OH)_2$.

12. The method as set forth in claim 10 wherein said acid is citric acid.

13. The method as set forth in claim 10 wherein said molar ratios most preferably are for phosphate ion to acid, about 1:1; for alkali metal ions to phosphate ions, about 2:1; for non-alkali metal cations to phosphate, about 2:1; for non-alkali metal cations to acid, about 2:1; and for the alkali metal ions to acid, about 2:1.

14. The method as set forth in claim 10 wherein said admixture is maintained at a temperature of room temperature or below during said admixing step.

15. The method as set forth in claim 14 wherein said heating step includes heating said admixture to a temperature of from about 150° F. to 400° F., and thereafter further admixing the admixture at said temperature for a period of from about 10 to 60 minutes.

16. The method as set forth in claim 10 including the steps of homogenizing said product and thereafter drying the same to give a dried product.

17. The method as set forth in claim 10 wherein a hydroxyl-containing compound is added to said admixture.

18. The method as set forth in claim 17 wherein said hydroxyl-containing compound is selected from the group consisting of maltodextrins and corn syrup, ranging in D.E. from 10-100, sucrose, dextrose, galactose, arabinose, ribose, xylose, maltose, lactose, raffinose, fructose and polyalcohols.

19. The compositions of matter produced by the process defined in claim 10.

* * * * *